(12) United States Patent
Baker et al.

(10) Patent No.: US 9,940,367 B1
(45) Date of Patent: Apr. 10, 2018

(54) SCORING CANDIDATE ANSWER PASSAGES

(71) Applicant: Google Inc., Mountain View, CA (US)

(72) Inventors: Steven D. Baker, Palo Alto, CA (US); Srinivasan Venkatachary, Sunnyvale, CA (US); Robert Andrew Brennan, Sherborn, MA (US); Per Bjornsson, Sunnyvale, CA (US); Yi Liu, San Bruno, CA (US); Hadar Shemtov, Palo Alto, CA (US); Massimiliano Ciaramita, Zurich (CH); Ioannis Tsochantaridis, Zurich (CH)

(73) Assignee: Google LLC, Mountain View, CA (US)

( * ) Notice: Subject to any disclaimer, the term of this patent is extended or adjusted under 35 U.S.C. 154(b) by 428 days.

(21) Appl. No.: 14/824,553

(22) Filed: Aug. 12, 2015

Related U.S. Application Data

(60) Provisional application No. 62/036,958, filed on Aug. 13, 2014.

(51) Int. Cl.
*G06F 17/30* (2006.01)
(52) U.S. Cl.
CPC ...... *G06F 17/3053* (2013.01); *G06F 17/3043* (2013.01)
(58) Field of Classification Search
CPC .................................................. G06F 17/3053
See application file for complete search history.

(56) References Cited

U.S. PATENT DOCUMENTS

| | | |
|---|---|---|
| 7,181,447 B2 | 2/2007 | Curtis |
| 7,844,598 B2 | 11/2010 | Masuichi |
| 7,953,720 B1 | 5/2011 | Rohde |
| 8,122,042 B2 | 2/2012 | Pan |
| 8,145,617 B1 | 3/2012 | Verstak |
| 8,380,713 B2 | 2/2013 | Oh |
| 8,463,791 B1 | 6/2013 | Bierner |
| 8,738,362 B2 | 5/2014 | Ferrucci |

(Continued)

FOREIGN PATENT DOCUMENTS

WO WO2012040674 A3 7/2012

OTHER PUBLICATIONS

Su et al., "Indexing Relational Database Content Offline for Efficient Keyword-Based Search," Stanford University, 2005, 13 pages.

(Continued)

*Primary Examiner* — Ajith Jacob
(74) *Attorney, Agent, or Firm* — Fish & Richardson P.C.

(57) ABSTRACT

Methods, systems, and apparatus, including computer programs encoded on a computer storage medium, for scoring candidate answer passages. In one aspect, a method includes receiving a query determined to be a question query that seeks an answer response and data identifying resources determined to be responsive to the query; for a subset of the resources: receiving candidate answer passages; determining, for each candidate answer passage, a query term match score that is a measure of similarity of the query terms to the candidate answer passage; determining, for each candidate answer passage, an answer term match score that is a measure of similarity of answer terms to the candidate answer passage; determining, for each candidate answer passage, a query dependent score based on the query term match score and the answer term match score; and generating an answer score that is a based on the query dependent score.

20 Claims, 12 Drawing Sheets

(56) References Cited

U.S. PATENT DOCUMENTS

| | | |
|---|---|---|
| 8,738,617 B2 | 5/2014 | Brown |
| 2006/0224582 A1 | 10/2006 | Hogue |
| 2011/0047171 A1 | 2/2011 | Paparizos |
| 2012/0084293 A1 | 4/2012 | Brown |
| 2013/0262501 A1 | 10/2013 | Kuchmann-Beauger |
| 2014/0141399 A1 | 5/2014 | Agarwal |

OTHER PUBLICATIONS

Wu et al., "Corroborating Answers from Multiple Web Sources," Proceedings of the 10th International Workshop on Web and Databases, 2007, 6 pages.

⌐ 550

Baggage Fees

⌐ 552

Airlines try to offset the cost of rising fuel prices. Many of the airlines charge excess baggage fees for checking one or more pieces of luggage. These fees are described in the following table.

⌐ 556

Airline Baggage Fees ⌐ 554

| Airline | First Bag | Second Bag | Additional Bag | Overweight | Oversized |
|---------|-----------|------------|----------------|------------|-----------|
| Airline A | $25 | $30 | $50 | $25 | $15 |
| Fly Fast | $25 | $30 | $40 | $50 | $5 |
| Comfort | $25 | $25 | $30 | $30 | $35 |
| Luxury Lines | $0 | $0 | $25 | $25 | $25 |
| Cheap Wings | $25 | $30 | $40 | $50 | $75 |
| Air Europe | $30 | $30 | $30 | $30 | $35 |
| Air Japan | $35 | $35 | $40 | $35 | $35 |

580 — 582 — 584 — 586 — 588 — 590 — 592

560  562  564  566  568  570

These fees in the above table are subject to change, so be sure to check with the airline to be sure the fees are accurate. ⌐ 555

FIG. 5B

SCORING CANDIDATE ANSWER PASSAGES

CLAIM OF PRIORITY

This application claims priority under 35 USC § 119(e) to U.S. Patent Application Ser. No. 62/036,958, filed on Aug. 13, 2014, the entire contents of which are hereby incorporated by reference.

BACKGROUND

This specification relates to search engine query processing.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, the capital of a state, etc. When queries that are in the form of a question are received, some search engines may perform specialized search operations in response to the question format of the query. For example, some search engines may provide information responsive to such queries in the form of an "answer," such as information provided in the form of a "one box" to a question.

Some question queries are better served by explanatory answers, which are also referred to as "long answers" or "answer passages." For example, for the question query [why is the sky blue], an answer explaining Rayleigh scatter is helpful. Such answer passages can be selected from resources that include text, such as paragraphs, that are relevant to the question and the answer. Sections of the text are scored, and the section with the best score is selected as an answer.

SUMMARY

In general, one innovative aspect of the subject matter described in this specification can be embodied in methods that include the actions of receiving a query determined to be a question query that seeks an answer response and data identifying resources determined to be responsive to the query and ordered according to a ranking, the query having query terms; for each resource in a top-ranked subset of the resources: receiving candidate answer passages, each candidate answer passage selected from passage units from content of the resource and being eligible to be provided as an answer passage with search results that identify the resources determined to be responsive to the query and being separate and distinct from the search results; determining, for each candidate answer passage, a query term match score that is a measure of similarity of the query terms to the candidate answer passage; determining, for each candidate answer passage, an answer term match score that is a measure of similarity of answer terms to the candidate answer passage; determining, for each candidate answer passage, a query dependent score based on the query term match score and the answer term match score; and generating an answer score that is a measure of answer quality for the answer response for the candidate answer passage based on the query dependent score. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Candidate answer passages are generated from both structured content and unstructured content according to corresponding selection criteria. This allows the user to not only receive prose-type explanations, but also to receive a combination of prose-type and factual information, which, in turn, may be highly relevant to the user's informational need.

When scoring the candidate answer passages, both query dependent and query independent signals are used. In the case of the former, the query dependent signals may be weighted based on the set of most relevant resources, which tends to surface answer passages that are more relevant than passage scored on a larger corpus of resources. This, in turn, reduces processing requirements and readily facilitates a scoring analysis at query time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5B is an illustration of another web page resource that includes a table from which structured content can be used to generate a candidate answer passage.

Like reference numbers and designations in the various drawings indicate like elements.

DETAILED DESCRIPTION

Overview

Figure 1A:
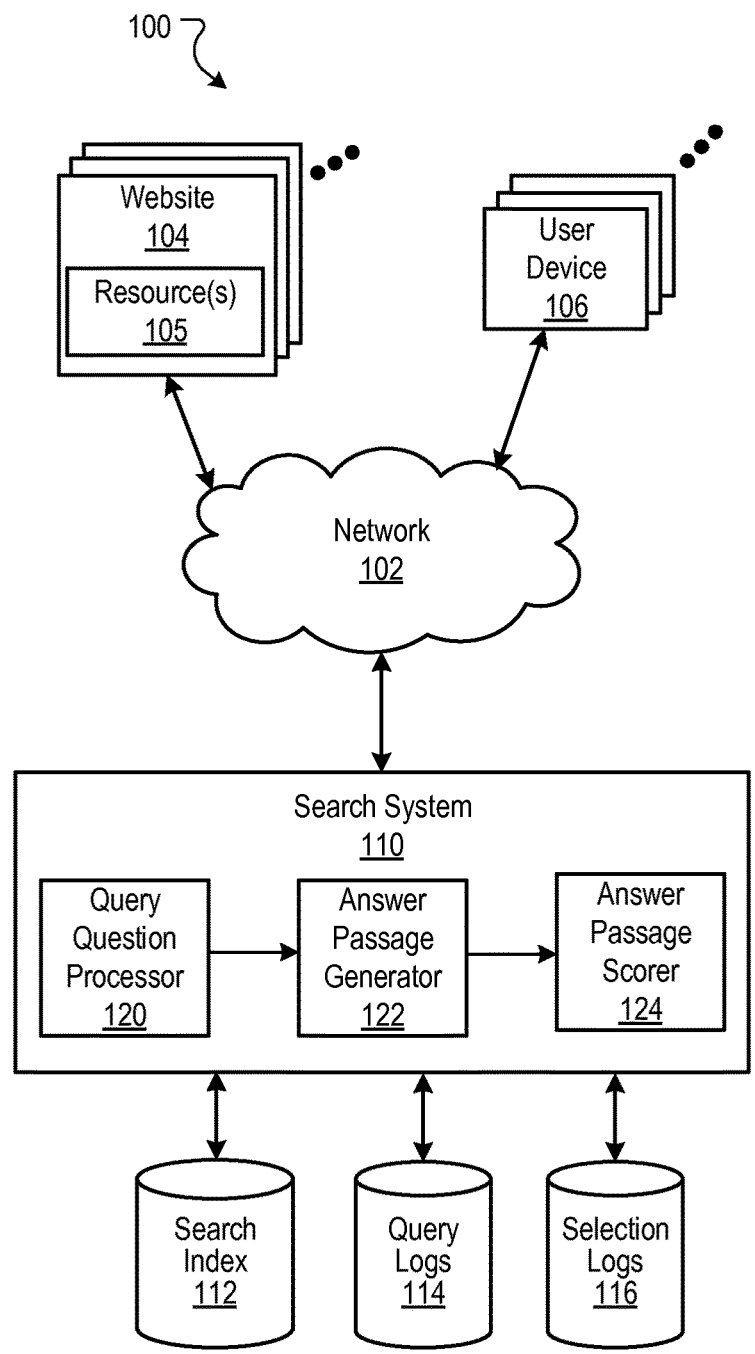
FIG. 1A is an illustration of an environment in which candidate answer passages are generated and scored.

An answer passage generator receives a query determined to be a question query that seeks an answer response and data identifying resources determined to be responsive to the query. The resources are ordered according to a ranking.

For each resource in a top-ranked subset of the resources, the answer passage generator identifies passage units in the resource. Each passage unit is content from the resource and is eligible for inclusion into a candidate answer passage. A passage unit can be a complete sentence, or a portion of structured content, such as cell value in a table. The answer passage generator applies a set of passage unit selection criterion to the passage units. Each passage unit selection criterion specifies a condition for inclusion of a passage unit in a candidate answer passage.

A first subset of passage unit selection criteria applies to structured content and a second subset of passage unit selection criteria applies to unstructured content. The unstructured content is content that is displayed in the form of text passages, e.g., such as an article, and that is not arranged according to a particular visual structure that emphasizes relations among data attributes. Structured content, on the other hand, is content that is displayed to emphasize relations among data attributes. Examples of structured content include lists, tables, and the like. Thus, while a resource may be structured as mark-up language, the usage of the terms "structured content" and "unstructured content" is with reference to the visual formatting of content for rendering, and with reference to whether the arrangement of the rendered content is in accordance with a set of related attributes, e.g., attributes defined by row and column types in a table, and where the content is listed in various cells of the table.

The answer passage generator generates, from passage units that satisfy the set of passage unit selection criterion, a set of candidate answer passages. Each candidate answer passage is eligible to be provided as an answer passage with search results that identify the resources determined to be responsive to the query, but separate and distinct from the search results, e.g., as in an "answer box."

After the answer passages are generated, an answer passage scorer scores each passage. The answer passage scorer determines a query dependent score for each answer passage. The query dependent score can, in some implementations, be based on a query term match score that is a measure of similarity of the query terms to the candidate answer passage, and an answer term match score that is a measure of similarity of answer terms to the candidate answer passage. The answer passage scorer can also determine a query independent score for the candidate answer passage. Based on these scores, the answer passage scorer generates an answer score for each candidate answer passage. The answer scores are then used to select a candidate answer passage to be provided with the search results. Alternately, the answer score can be adjusted by additional scoring processes.

These features and addition features are described in more detail in the sections that follow.

Example Operating Environment

FIG. 1 is an illustration of an environment 100 in which candidate answer passages are generated and scored. A computer network 102, such as the Internet, connects publisher websites 104, user devices 106, and a search engine 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts.

Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts. A user device 106 is an electronic device capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 crawls the publisher websites 104 and indexes the resources provided by the publisher websites 104. The index data are stored in a resource index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and, optionally, a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken in response to search results provided by the search engine 110. Examples of such actions include clicks on the search results. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Question Queries and Answer Passages

As described above, some queries are in the form of question, or in the form of an implicit question. For example, the query [distance of the earth from the moon] is in the form of an implicit question "What is the distance of the earth from the moon?" Likewise, a question may be specific, as in the query [How far away is the moon]. The search system 110 includes a query question processor 120 that utilizes processes to determine if a query is a query question, and, if so, to trigger the generation of answers that are responsive to the question. The query question processor 120 can use a variety of different algorithms to determine whether a query is a question. For example, the query question processor 120 may utilize language models, machine learned processes, knowledge graphs, grammars, or combinations thereof to determine question queries and answers.

In some implementations, the search system 110 may select candidate answer passages in addition to or instead of an answer fact. For example, for the query [how far away is the moon], an answer fact is 238,900 miles. This is the average distance of the Earth from the moon. However, the search system 110 includes an answer passage generator 122 that generates candidate answer passages, and an answer passage scorer 124 that scores the candidate answer passages. Based on these scores, one passage is selected and provided in response to the query.

The candidate answer passages are generated from the resources that are identified as being responsive to the query. In some implementations, the answer passage generator only uses the top N ranked resources to generate and score the answer passages. In the sections that follow, the use of the top N ranked resources is described. However, a larger set of resources can also be used.

Figure 2:
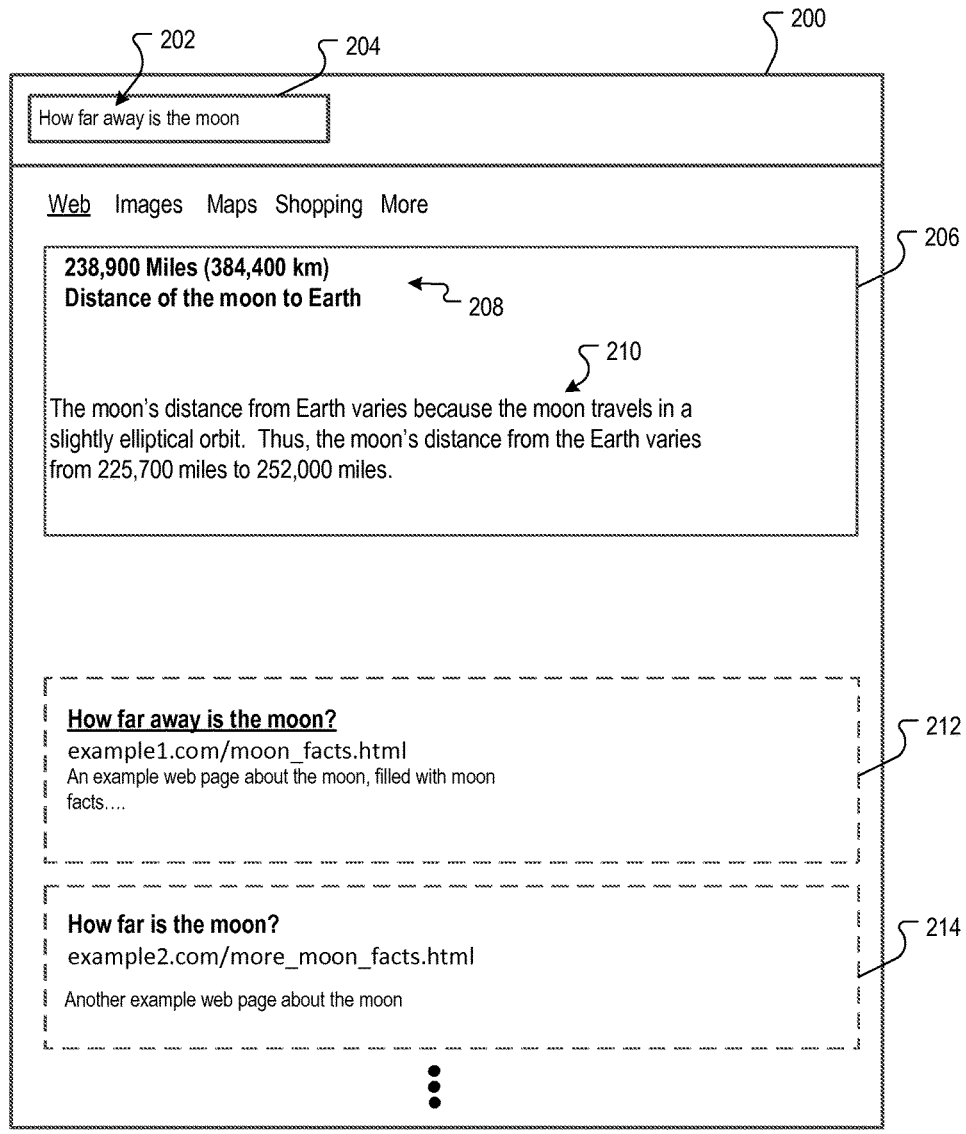
FIG. 2 is an illustration of a search results resource in which an answer passage is provided with an answer to a question query.

FIGS. 2-5A provide examples of answer passages generated from unstructured content and structured content of resources. In particular, FIG. 2 is an illustration of a search results resource 200 in which an answer passage is provided with an answer to a question query. The answer passage is generated from unstructured content. The query 202 [How far away is the moon] has been input in the input field 204. The query question processor 120 identifies the query as a question query, and also identifies the answer 208 "289,900 Miles (364,400 km)." The search system 110, in connection with the query question processor 120, provides an answer box 206 in response to the determination that the query is a question query and that an answer is identified. The answer box 206 includes the answer 208.

Additionally, the answer box 206 includes an answer passage 210 that is generated and selected by the answer passage generator 122 and the answer passage scorer 124. The answer passage 210 is one of multiple answer passages that were processed by the answer passage generator 122 and the answer passage scorer 124. Additional information, such as search results 212 and 214, can also be provided on the search results page. The search results are separate and distinct from the answer passage 210.

Figure 3:
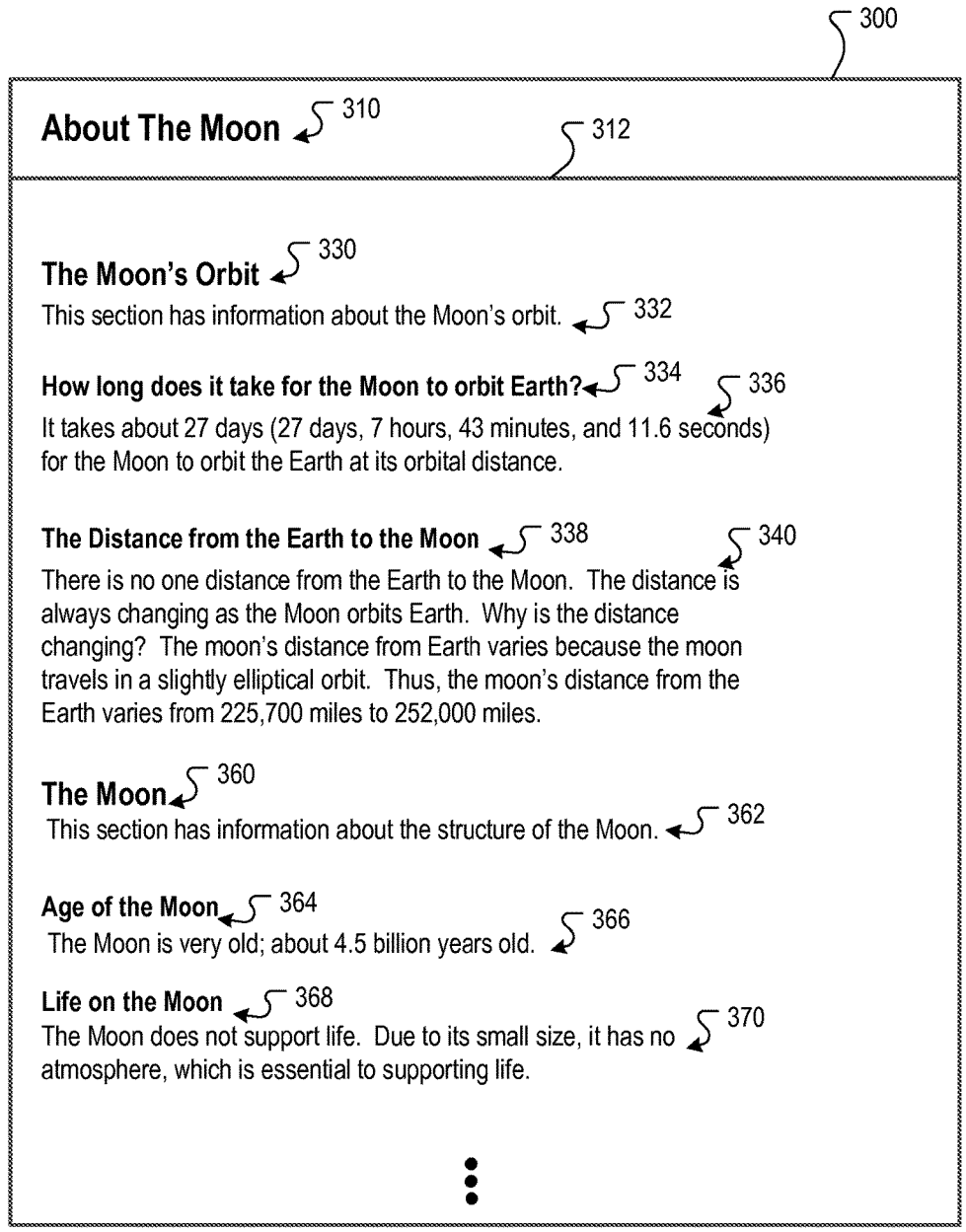
FIG. 3 is an illustration of a web page resource from which the answer passage of FIG. 2 was selected.

FIG. 3 is an illustration of a web page resource 300 from which the answer passage 210 of FIG. 2 was selected. The web page resources 300 is, for example, one of the top ranked resources responsive to the query [How far away is the moon] and the answer passage generator 122 can generate multiple candidate answer passages from the content of the resource 300. The resource 300 includes multiple heading 310, 330, 334, 338, 360, 364, and 368. Headings 330, 334, 338, 360, 364, and 368 have respective corresponding text sections 332, 336, 340, 362, 366 and 370 that are subordinate. As used herein, a section is subordinate to a heading when the structure is such that the section directly "descends" from the heading. A text section need not be adjacent to the heading to which it is subordinate; for example, a heading may be linked in a resource that causes the browser to scroll to another portion of the resource so that the viewport is focused on the text section. In the context of a document object model, a text section is subordinate to a heading when it is subordinate body text to the heading. For example, in FIG. 3, the text 340 is subordinate to the heading 338; but it is not subordinate to the heading 334, 330, or 310.

As will be described in more detail below, multiple different candidate answer passages are generated from the resource 300 and scored. For example, with respect to FIG. 3, the following candidate answer passages may be among many generated by the answer passage generator 122 from the resource 300:

(1) It takes about 27 days (27 days, 7 hours, 43 minutes, and 11.6 seconds) for the Moon to orbit the Earth at its orbital distance.

(2) Why is the distance changing? The moon's distance from Earth varies because the moon travels in a slightly elliptical orbit. Thus, the moon's distance from the Earth varies from 225,700 miles to 252,000 miles.

(3) The moon's distance from Earth varies because the moon travels in a slightly elliptical orbit. Thus, the moon's distance from the Earth varies from 225,700 miles to 252,000 miles.

Figure 4:
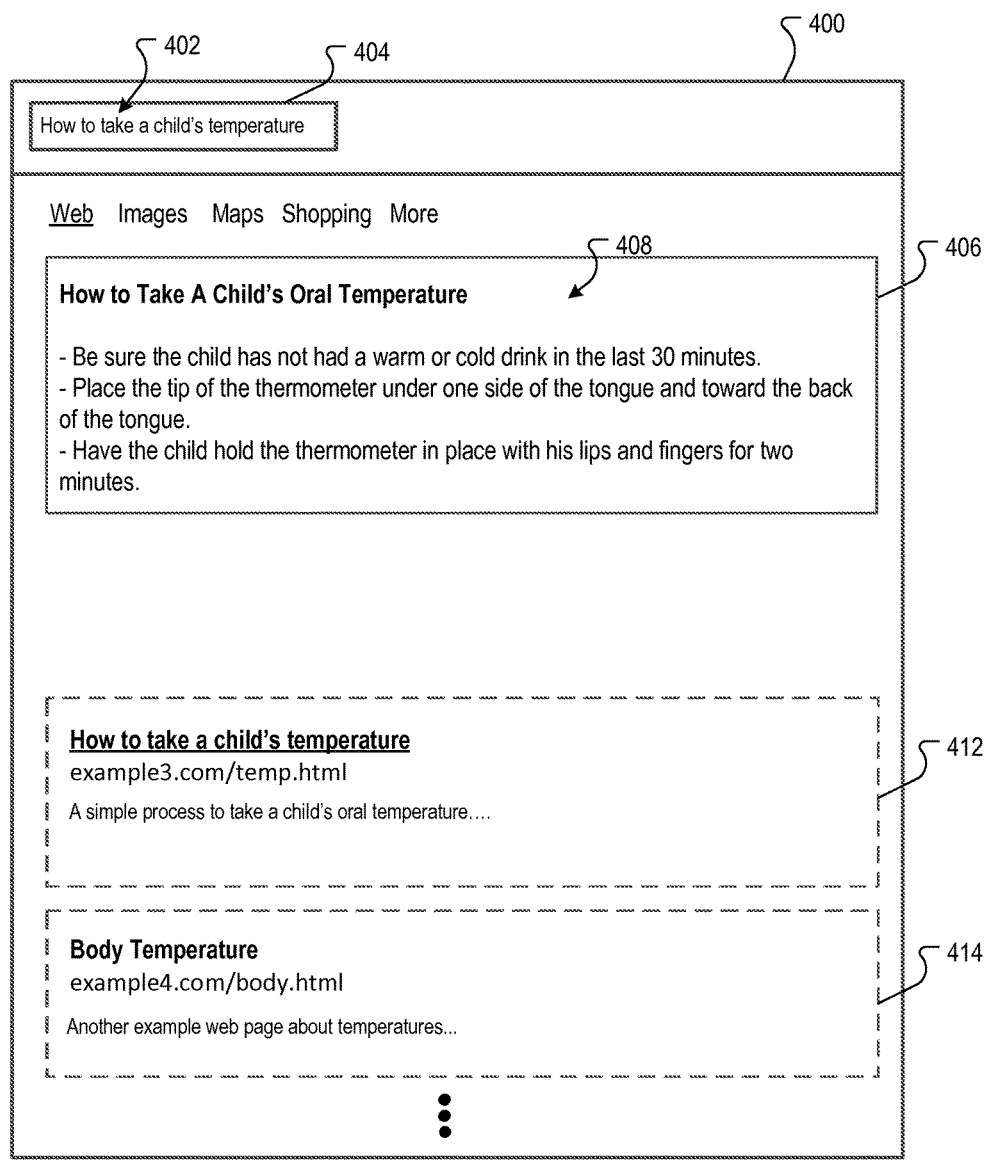
FIG. 4 is an illustration of another search results resource in which an answer passage is provided with an answer to a question query.

FIG. 4 is an illustration of another search results resource 400 in which an answer passage 410 is provided as an answer to a question query. The answer passage is generated from a combination of structured and unstructured content. The query 402 [How to take a child's temperature] has been input in the input field 404. The query question processor 120 identifies the query as a question query. The search system 110, in connection with the query question processor 120, answer passage generator 122, and the answer passage scorer 124, provides an answer box 406 in response to the determination that the query is a question query and that an answer is identified. The answer box 406 includes the answer passage 408. Additional information, such as search results 412 and 414, can also be provided on the search results resource 400.

Figure 5A:
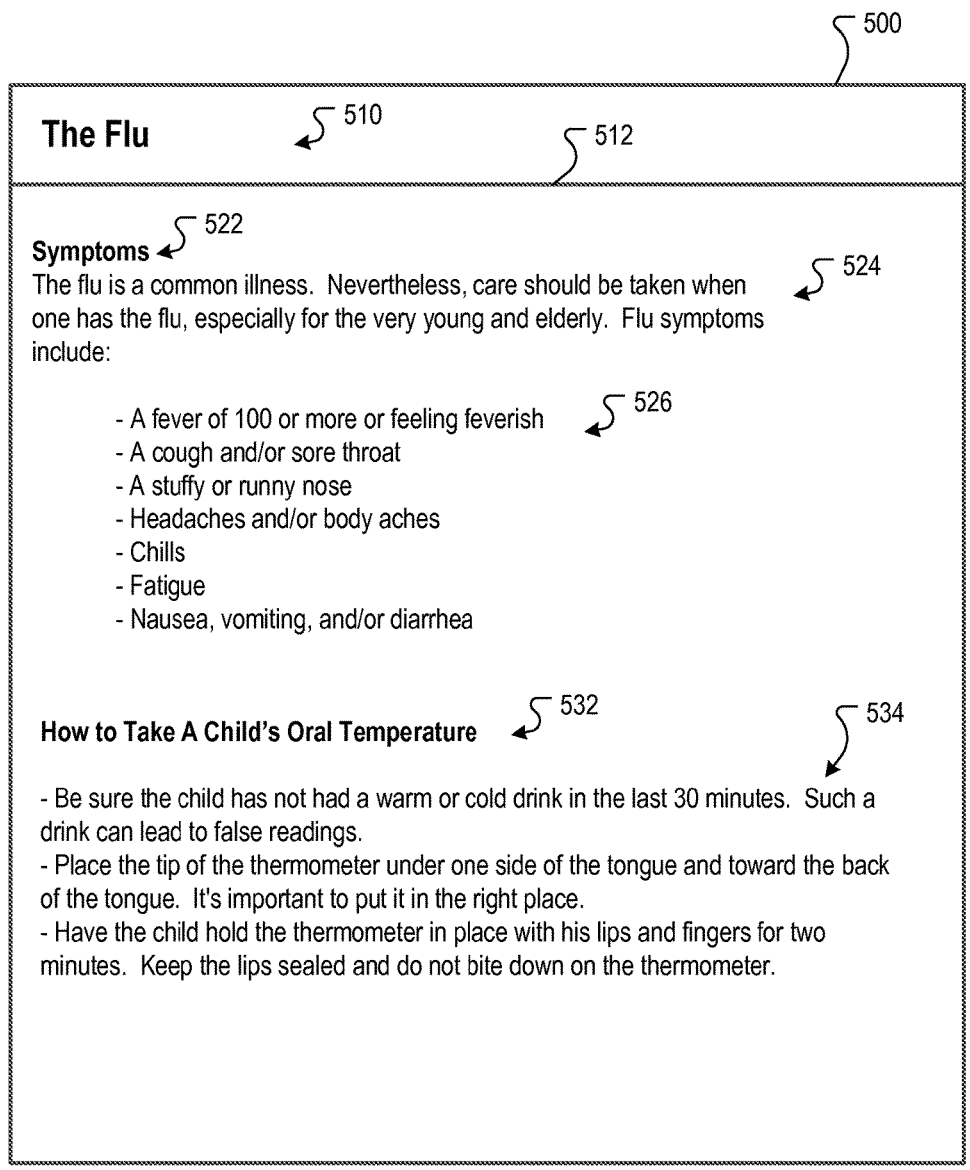
FIG. 5A is an illustration of another web page resource from which the answer passage of FIG. 4 was selected.

FIG. 5A is an illustration of another web page resource from which the answer passage of FIG. 4 was selected. The web page resources 500 is, for example, one of the top ranked resources responsive to the query [How to take a child's temperature] and the answer passage generator 122 can generate multiple candidate answer passages from the content of the resource 500. The resource 500 includes unstructured content 522, 524, and 532, and structured content 526 and 534. As will be described in more detail below, multiple different candidate answer passages are generated from the resource 400 and scored. Pursuant to the processes described below, the candidate answer passage generated from the unstructured content 532 and the list 534 is selected.

The structured content that are shown in FIG. 5A are lists; however, other types of structured content can be tables, for example, such as the table 556 shown in the resource 550 illustrated in FIG. 5B. The resource 550 includes unstructured content 552, 554 and 555, and the table 556. The table includes columns 560-570 and rows 580-592. Column 560 corresponds to an airline attribute, and the remaining columns 562-570 correspond to various baggage fee attributes. Each cell value expresses the relation between the corresponding airline and baggage fee in terms of a price value.

The following sections describe the generation of answer passages and the scoring of answer passages. The processes described in each section are discussed with reference to FIG. 1B, which is a system flow diagram illustrating a process of generating and scoring candidate answer passages.

Generating Answer Passages

Figure 6:
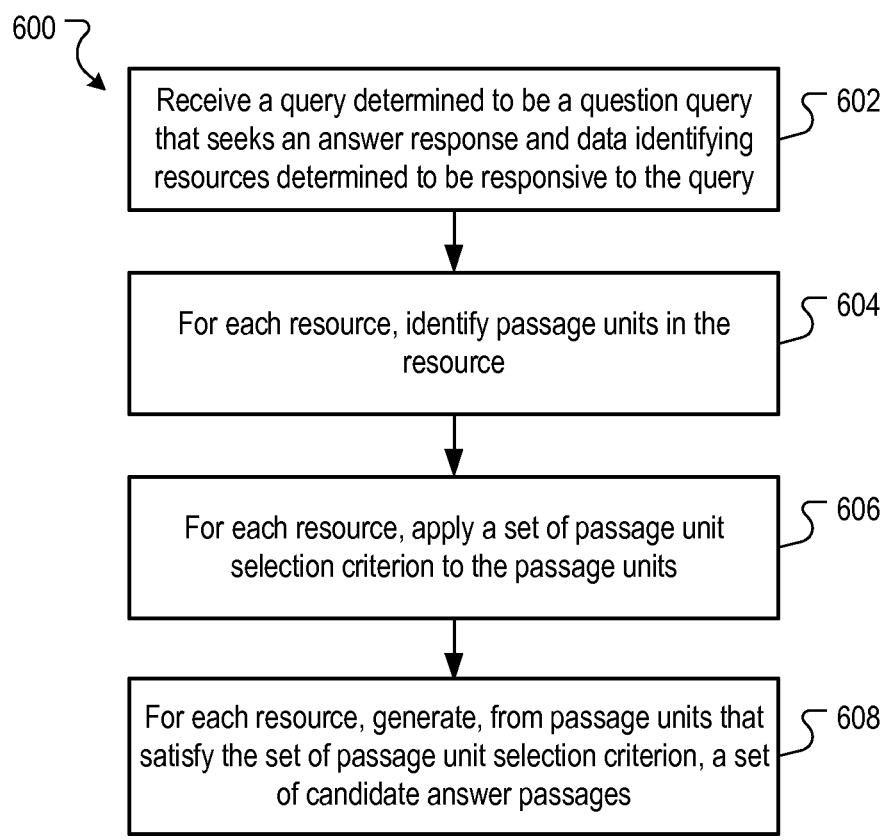
FIG. 6 is a flow diagram of an example process for generating answer passages.

FIG. 6 is a flow diagram of an example process 600 for generating answer passages. The process 600 is implemented in a data processing apparatus, such as one or more computers in a search system 110 and that are programmed to perform the operations of the answer passage generator 122.

The process 600 receives a query determined to be a question query that seeks an answer response and data identifying resources determined to be responsive to the query (602). For example, the answer passage generator 122 receives a query processed by the search system 110, and data identifying responsive resources. The resources are ranked according to corresponding search scores generated by the search system 110.

The process 600, for each resource, identifies passage units in the resource (604). A passage unit can be a complete sentence, a portion of a sentence, a header, or content of structured data, such as a list entry or a cell value. For example, for the resource 300, the passage units may be headers and sentences. For the resource 500, the passage units are headers, sentences and list entries. A variety of appropriate processes can be used to identify passage units, such as sentence detection, mark-up language tag detection, etc.

The process 600, for each resource, applies a set of passage unit selection criterion 130 to the passage units (606). Each passage unit selection criterion specifies a condition for inclusion of a passage unit in a candidate answer passage. A first subset of passage unit selection criteria applies to structured content and a second subset of passage unit selection criteria applies to unstructured content. Unstructured content, such as sentences, tends to describe answers in prose form; however, structured content, such as tables and lists, tends to describe answers in terms of attribute values and attribute relations, or fact sets. For example, in the case of a list, the list comprises ordered attributes of list entries. In the case of a table, row and column attributes define relations between various attributes. The application of passage unit selection criteria is described in more detail with reference to FIG. 7 below.

The process 600, for each resource, generates, from passage units that satisfy the set of passage unit selection criterion, a set of candidate answer passages 132 (608). Each resource may be used to generate multiple candidate answer passages. These candidate answer passages are then provided to the answer passage scorer 124 for scoring.

Figure 7:
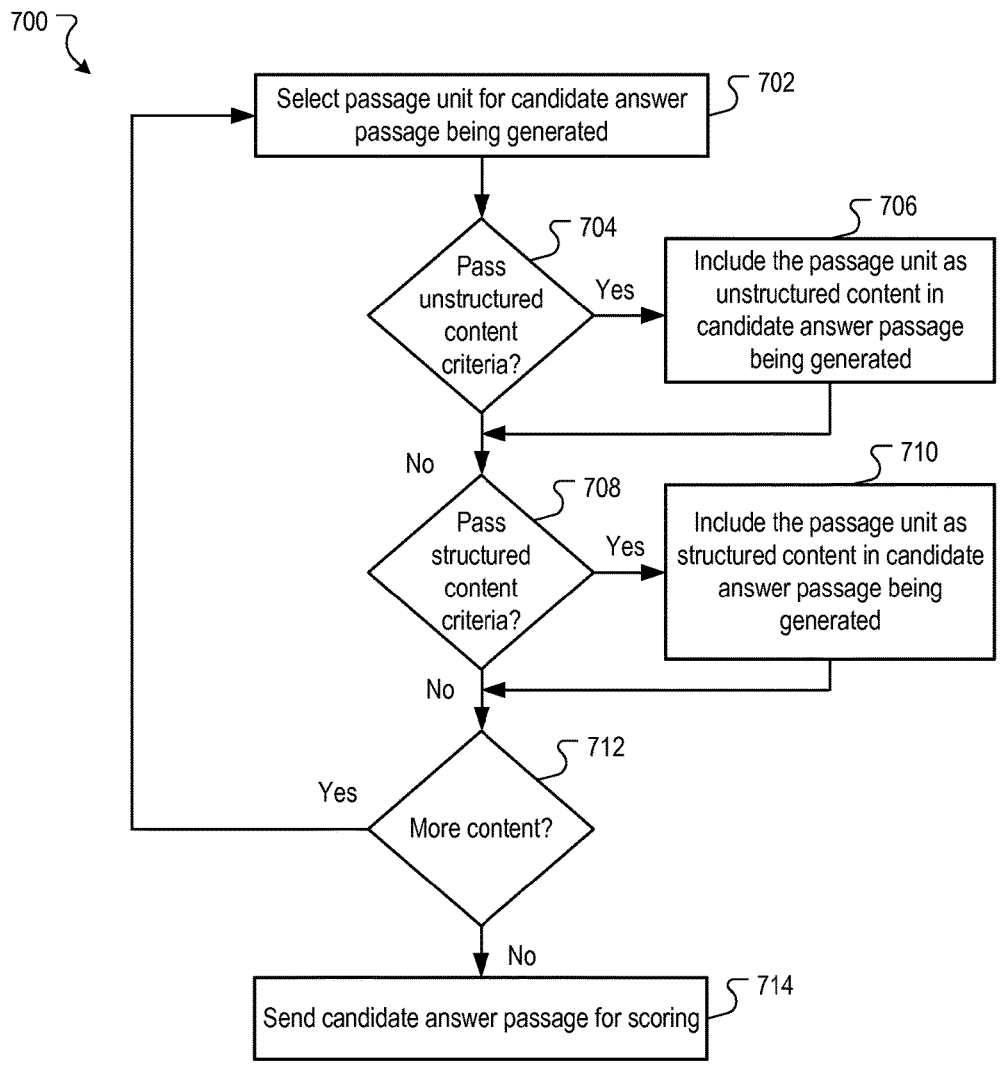
FIG. 7 is a flow diagram of an example process for generating answer passages according to structure content criteria and unstructured content criteria.

FIG. 7 is a flow diagram of an example process 700 for generating answer passages according to structure content criteria and unstructured content criteria. The process 700 is implemented in a data processing apparatus, such as one or more computers in a search system 110 and that are programmed to perform the operations of the answer passage generator 122.

The process 700 selects a passage unit for a candidate answer passage being generated (702). For example, with reference to FIG. 3, a header or a sentence may be selected. With reference to FIG. 5A, a header, sentence, or list entry may be selected. And with reference to FIG. 5B, a header, sentence, table entry (such as a cell value or even an entire row) may be selected.

The type of passage unit selected—structured content or unstructured content—may determine what types of criteria are applied to it. Furthermore, the status of the candidate answer passage being generated—e.g., whether it has yet to be populated with any passage units or whether it currently has one or more passage units—may also be determinative of what types of criteria are applied to it.

The process 700 determines whether the passage unit passes unstructured content criteria (704). A variety of unstructured content criteria can be used, and the following examples are illustrative. One criterion that is checked for unstructured content is sentence score that indicates whether the passage unit is a complete sentence. If the passage unit is unstructured content and is not a complete sentence, it may be omitted from the candidate answer passage, or additional content may be added to the passage unit until a complete sentence is detected.

Another type of unstructured content criterion is a minimum number of words. If the passage unit does not have a minimum number of words, it may be omitted from the candidate answer passage, or additional content may be added to the passage unit until the minimum number of words are included in the passage unit.

Another type of unstructured content criterion is the visibility of the content. This criterion may also be used for structured content. For example, if the content is text that is rendered so that it is invisible to a user, then it is not included in a candidate answer passage. The content can be processed to detect visibility tags, for example, to detect whether the content is visible.

Another type of unstructured content criterion is a boilerplate detection. This criterion may also be used for structured content. For example, if the content is text that is determined to be boilerplate, then it is not included in a candidate answer passage. A variety of appropriate boilerplate detection processes can be used.

Another type of unstructured content criterion is alignment detection. If, for example, the content is aligned such that is not contiguous with other content already in the candidate answer passage, then it is not included in the candidate answer passage. Other formatting criteria can also be used.

Another type of unstructured content criterion is subordinate text detection. For example, only text that is subordinate to a particular heading may be included in a candidate answer passage. Thus, with reference to FIG. 3, text from the text portion 336 and text from the text portion 340 may not be included in a same candidate answer passage. Similarly, another criterion may be limiting a heading to only be a first sentence in a candidate answer passage.

Another type of unstructured content criterion is image caption detection. For example, a passage unit that is an image caption cannot be combined with other passage units in a candidate answer passage.

The unstructured content criterion may also specify particular criteria that are applied when structured content is already in a candidate answer passage being constructed. For example, one criterion may specify that once structured content is included in a candidate answer passage, subsequent unstructured content cannot be added to the candidate answer passage. To illustrate, assume a candidate answer passage has a row from the table 556; the unstructured content 555 thus cannot be added to follow the row in the candidate answer passage.

Another type of criterion for unstructured content that is applied in the presence of structured content is an enumerating reference check of a sentence immediately preceding structured content, such as a table. For example, in the resource 550, the last complete sentence preceding the table 556 begins with the word "these," which is an enumerating reference. If the sentence includes an enumerating reference, then only the sentence is included in the candidate answer passage before the structured content; otherwise, two or more sentences preceding the structured content are included in the candidate answer passage before the structured content.

Additional types of criteria for unstructured content can also be used when generating candidate answer passages, such as a maximum size of a candidate answer passage, exclusion of anchor text in a candidate answer passage, etc.

If the process 700 determines that the passage unit passes unstructured content criteria, then the process 700 includes the passage unit as unstructured content in the candidate answer passage being generated (706). Thereafter, or if the process 700 determines that the passage unit does not pass unstructured content criteria, the process 700 determines whether the passage unit passes structured content criteria (708). As described above, some structured content criteria may be applied when only structured content is included in the answer passage, and some structured content criteria may be applied only when there is both structured and unstructured content in the answer passage.

For example, one type of structured content criterion is incremental list generation. Passage units are iteratively selected from the structured content such that only one passage unit from each relational attribute is selected before any second passage unit from a relational attribute is selected. This iterative selection may continue until a termination condition is met. To illustrate, when generating the candidate answer passage from the list 534, the answer passage generator 122 may only select one passage unit from each list element, e.g., one sentence. This helps ensure that a complete list is more likely to be generated as a candidate answer passage. With reference to the answer passage 406, it includes only the first sentence of each list element of the list 534. Additional sentences are not included because a termination condition, e.g., a maximum size, was met, thus precluding the inclusion of the second sentence of the first list element—"Such a drink can lead to false readings." Generally, in short lists, the second sentence of a multi-sentence list element is less informative than the first sentence, and thus emphasis is on generating the list in order of sentence precedence for each list element.

Another type of structured content criterion is inclusion of all steps in a step list. If the answer passage generator 122 detects structured data defining a set of steps, e.g., by detecting preferential ordering terms, then all steps are included in the candidate answer passage. Examples of preferential ordering terms are terms that imply order steps, such as "steps," or "first," "second," etc. If a preferential ordering term is detected, then all steps from the structured content must be included in the candidate answer passage. In some implementations, if including all steps exceeds a maximum passage size, then the candidate answer passage is discarded. In other implementations, the maximum passage size can be ignored for that candidate answer passage.

Another type of structured content criterion is superlative ordering. When the candidate answer passage generator 122 detects a superlative query in which a query inquires of superlatives defined by an attribute, then the candidate answer passage generator 122 selects, from the structured content for inclusion in the candidate answer passage, a subset of passage units in descending ordinal rank according to the attribute. For example, for the query [longest bridges in the world], a resource with a table listing the 100 longest bridges may be identified. The candidate answer passage generator 122 selects, for example, the rows for the three longest bridges. Likewise, if the query were [countries with smallest populations], a resource with a table listing the 10 smallest countries may be identified. The candidate answer passage generator 122 selects, for example, the rows for the countries with the three smallest populations.

Another type of structured content criterion is informational question query detection. When the candidate answer passage generator 122 detects an information question query in which a query inquires of an information set for a variety of attributes, then the candidate answer passage generator 122 select the entire set of structured content, provided the entire set can be provided as an answer passage. For example, for the query [nutritional information for Brand X breakfast cereal], a resource with a table listing the nutritional information of the cereal may be identified. The candidate answer passage generator 122 selects, for example, the entire table for inclusion in the candidate answer passage.

Another type of structured content criterion is an entity attribute query detection. When the candidate answer passage generator 122 detects a question query requests an attribute of a particular entity or defined set of entities, a passage units that includes an attribute value of the attribute of the particular entity or the defined set of entities is selected. For example, for the question query [calcium nutrition information for Brand X breakfast cereal], the candidate answer passage generator 122 selects only the attribute values of the table that describe the calcium information for the breakfast cereal.

Another type of structured content criterion is key value pair detection. For example, when the structured content includes enumerated key value pairs, then each passage unit must include a complete key value pair. This precludes the selecting of a key without the corresponding value, and likewise the selection of the value without the corresponding key.

Additional types of criteria for structured content can also be used when generating candidate answer passages, such as a maximum size of a candidate answer passage, exclusion of anchor text in a candidate answer passage, etc.

If the process 700 determines the passage unit passes the structured content criteria, then the process 700 includes the passage unit as structured content in candidate answer passage being generated (710). Thereafter, or if the process 700 determines the passage unit does not pass the structured content criteria, the process determines if more content is to be processed for the candidate answer passage (712).

If the process 700 determines more content is to be processed for the candidate answer passage, then the process 700 returns to process operation 702. Otherwise, the process 700 sends the candidate answer passage to the answer passage scorer 124 for scoring (714).

Scoring Answer Passages

The answer passage scorer 124 receives candidate answer passages 132 from the answer passage generator 122 and scores each passage by combining scoring signals that predict how likely the passage is to answer the question. In some implementations, the answer passage scorer 124 includes a query dependent scorer 142 and a query independent scorer 144 that respectively generate a query dependent score and a query independent score. In some implementations, the query dependent scorer 142 generates the query dependent score based on an answer term match score and a query term match score. Generation of these component scores is described in more detail below.

A score combiner 144 combines the scores for each candidate answer passage 132 to generate a corresponding answer score 134. The answer score is then used to select a candidate answer passage to provide with the search results, or, alternately, may be adjusted according to additional scoring processes.

A candidate answer passage can also be scored based on only one of the query dependent scores and a query independent score. For example, only the query dependent score may be used for the answer score.

Figure 8:
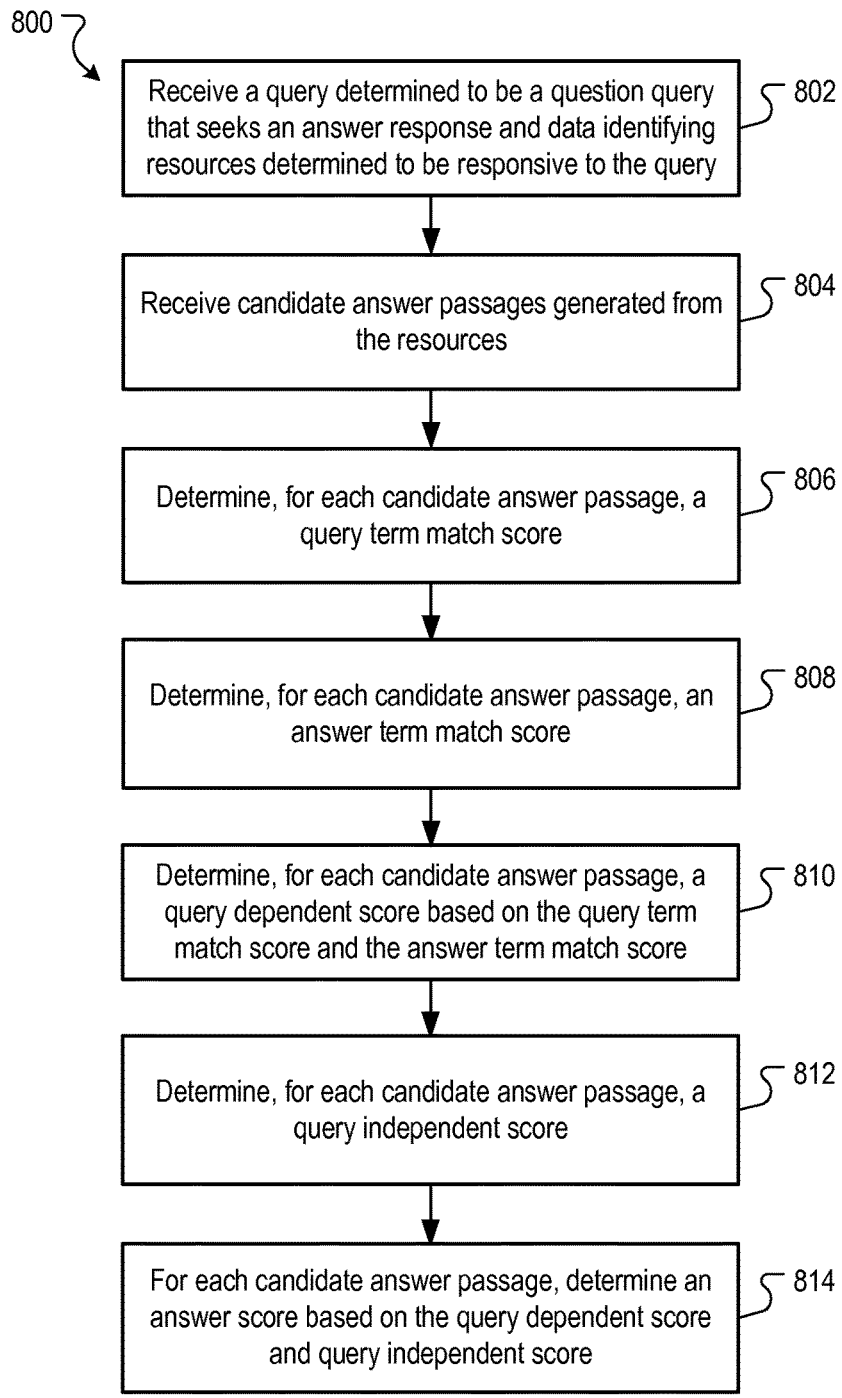
FIG. 8 is a flow diagram of an example process for scoring answer passages.

FIG. 8 is a flow diagram of an example process 800 for scoring answer passages. The process 800 is implemented in a data processing apparatus, such as one or more computers in a search system 110 and that are programmed to perform the operations of the answer passage scorer 124.

The process 800 receives a query determined to be a question query that seeks an answer response and data identifying resources determined to be responsive to the query (802). For example, the answer passage scorer 122 receives a query processed by the search system 110, and data identifying responsive resources. The resources are ranked according to corresponding search scores.

Figure 1B:
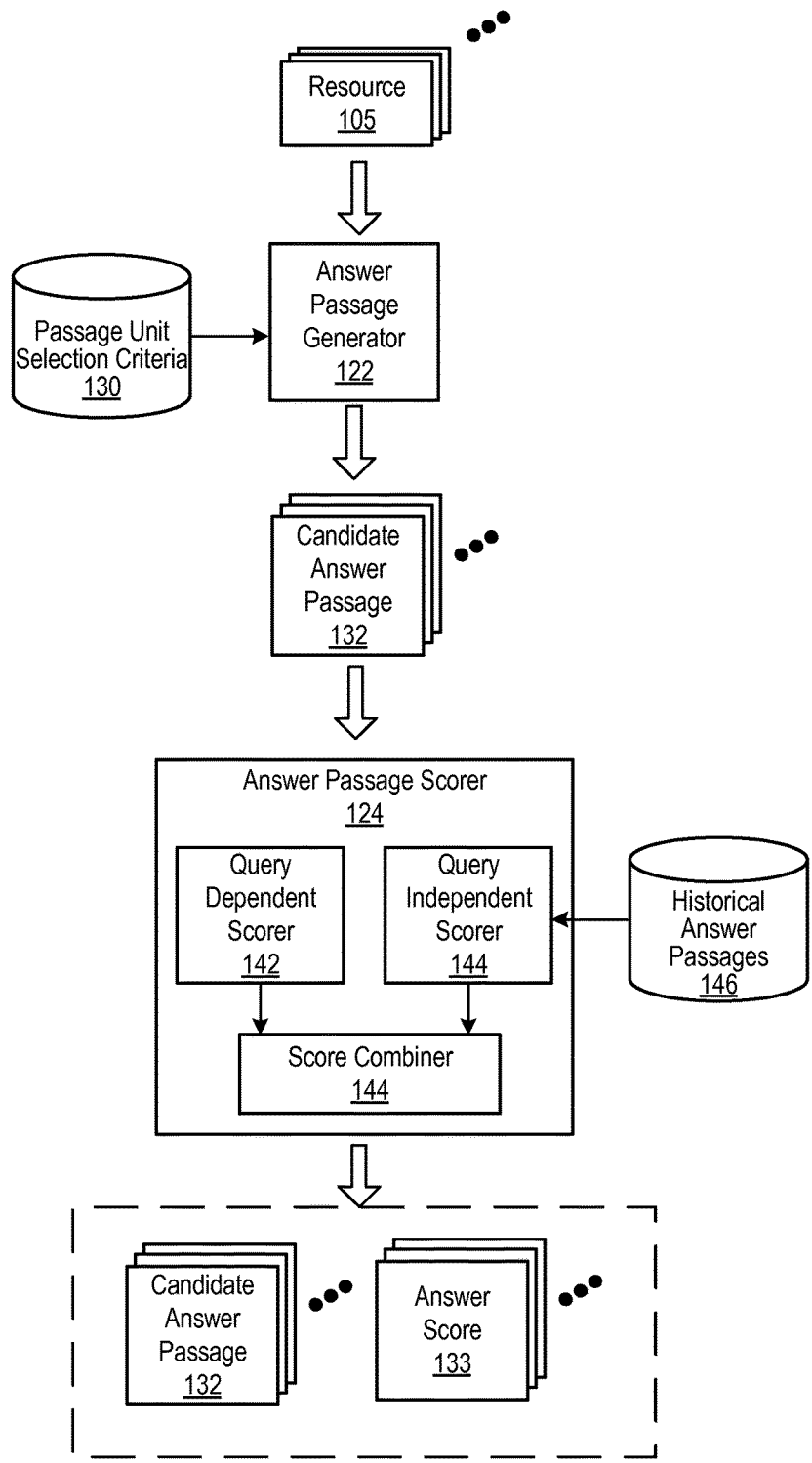
FIG. 1B is a system flow diagram illustrating a process of generating and scoring candidate answer passages.

The process 800 receives candidate answer passages 132 generated from the resources (804). For example, as shown in FIG. 1B, the answer passage scorer 124 receives the candidate answer passages 132 from the answer passage generator 122.

The process 800 determines, for each candidate answer passage, a query term match score (806). The query term match score is a score that is a measure of similarity of the query terms to the candidate answer passage. In some implementations, the query dependent scorer 142 determines a score that is proportional to a number of instances of matches of query terms to terms of the candidate answer passage. The query terms can be weighted, e.g., by term frequency/inverse document frequency (TF/IDF) values, for example. Any appropriate algorithm to determine the match similarity between the query text and answer text can be used.

The process 800 determines, for each candidate answer passage, an answer term match score (808). The answer term match score is a score that is a measure of similarity of the answer terms to the candidate answer passage. Because the answer seeking queries do not describe what the user is looking for, as the answer is unknown to the user, the query dependent scorer 142 first finds a set of likely answer terms and compares the set of likely answer terms to the candidate answer passage to generate the answer term match score. This process of generating the answer term match score is described in more detail with reference to FIG. 10 below.

The process 800 determines, for each candidate answer passage, a query dependent score based on the query term match score and the answer term match score (810). The query term match score and the answer term match score can be combined in a variety of appropriate ways. For example, the scores can be summed; or the scores can be multiplied together; or combined in other appropriate ways.

The process 800 determines, for each candidate answer passage, a query independent score (812). A query independent score is a score that does not take into account a matching of query terms to the candidate answer passage itself. Instead, the query independent score takes into account various features of the resources and various features of the candidate answer passages that do not directly relate on the query terms. Examples of such features include the location on the resource of the text of the candidate answer passage; a language model score of the language of the candidate answer passage; whether the candidate answer passage includes text that crosses paragraph boundaries; and whether the candidate answer passage is itself or includes a question sentence. These features and additional features are described in more detail in FIG. 9 below.

The process 800, for each candidate answer passage, determines an answer score based on the query dependent score and query independent score (814). The query dependent score and the query independent score can be combined in a variety of appropriate ways. For example, the scores can be summed; or the scores can be multiplied together; or combined in other appropriate ways.

Query Independent Scoring

Figure 9:
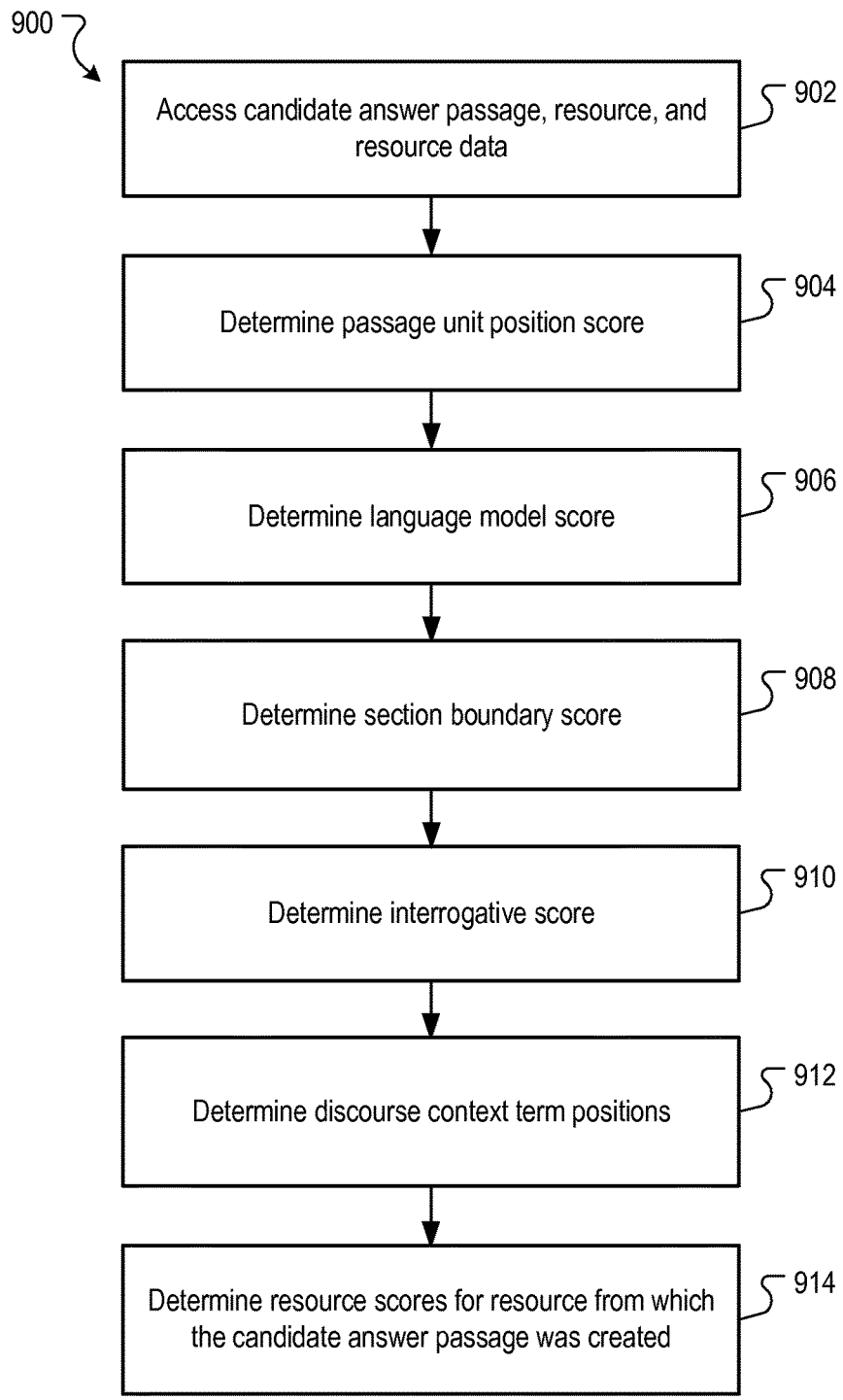
FIG. 9 is a flow diagram of an example process for scoring answer passages according to query independent features.

FIG. 9 is a flow diagram of an example process 900 for scoring answer passages according to query independent features. The process 900 is implemented in a data processing apparatus, such as one or more computers in a search system 110 and that are programmed to perform the operations of the answer passage scorer 124. The features of FIG. 9 are illustrative, and more scoring features, or fewer scoring features, can be used when determining a query independent score.

The process 900 accesses candidate answer passage 132, resources 105, and resource data (902). In some implementations, the candidate answer passages 132 are generated from the top N ranked resources identified for a search in response to a search query. The value of N may vary, and in some implementations N is the same number as the number of search results returned on the first page of search results.

The process 900 determines a passage unit position score (904). The passage unit position is the location on the resource of the text of the candidate answer passage. The higher the location results in a higher score.

The process 900 determines language model score (906). The language model score generates a score based on the candidate answer passages conforming to a language model. One type of language model is based on sentence and grammar structures. Candidate answer passage with partial sentences may have a lower score than a candidate answer passage with complete sentences. In some implementations, if structured content is included in the candidate answer passage, the structured content is not subject to language model scoring. For example, a row from a table may have a very low language model score, but may be very informative.

Another language model takes into account whether the candidate answer passage text appears similar to answer text in general. The query independent scorer 142 accesses a language model of historical answer passages 146, where the historical answer passages 146 are answer passages that have been served for all queries. In general, answer passages that have been served generally have a similar n-gram structure, as the answer passages include explanatory and declarative statements. In some implementations, the query independent score 146 uses a tri-gram model that compares trigrams of the candidate answer passage to the tri-grams of the historical answer passages 146. A higher quality candidate answer passage will typically have more tri-gram matches to the historical answer passages 146 than a lower quality candidate answer passage.

The process 900 determines a section boundary score (908). A candidate answer passage will be penalized if it includes text that passes formatting boundaries, such as paragraphs and section breaks, for example.

The process 900 determines an interrogative score (910). The query independent scorer searches the candidate answer passage for interrogative terms. A candidate answer passage that includes a question or question term, e.g., "How far is away is the moon from the Earth?" is generally not has helpful to a user as a candidate answer passage that includes only declarative statements, e.g., "The moon is approximately 238,900 miles from the Earth."

The process 900 determines discourse boundary term position score (912). A discourse boundary term is a term that introduces a statement or idea that is contrary to or a modification of a statement or idea that has just been made or referred to. These terms include, for example, "conversely," "however," "on the other hand," and so on. A candidate answer passage that begins with such a term receives a relatively low discourse boundary term position score, which lowers the answer score. A candidate answer passage that includes but does not begin with such a term receives a higher discourse boundary term position score than it would if it began with the term. Finally, a candidate answer passage that does not include such a term receives a high discourse boundary term position score.

The process 900 determines resource scores for resource from which the candidate answer passage was created (914). The resource scores may include a ranking score, a reputation score, and site quality score. Generally, the higher these scores are, the higher the answer score will be.

The ranking score is based on the ranking score of the resource from which the candidate answer passage was created. The ranking can be a search score of the resource for the query, and is applied to all candidate answer passages that were derived from the resource. The ranking score can be provided by another subsystem of the search system 110.

The reputation score of the resource is a score that indicates the trustworthiness and/or likelihood that that subject matter of the resource serves the query well. The reputations score can be provided by another subsystem of the search system 110.

The site quality score is a measure of quality of a website that hosts the resource from which the candidate answer passage was created. The site quality score can be provided by another subsystem of the search system 110.

The component query independent scores described above can be combined in a variety of appropriate ways to determine the query independent score. For example, the scores can be summed; or the scores can be multiplied together; or combined in other appropriate ways.

Query Dependent Scoring

Figure 10:
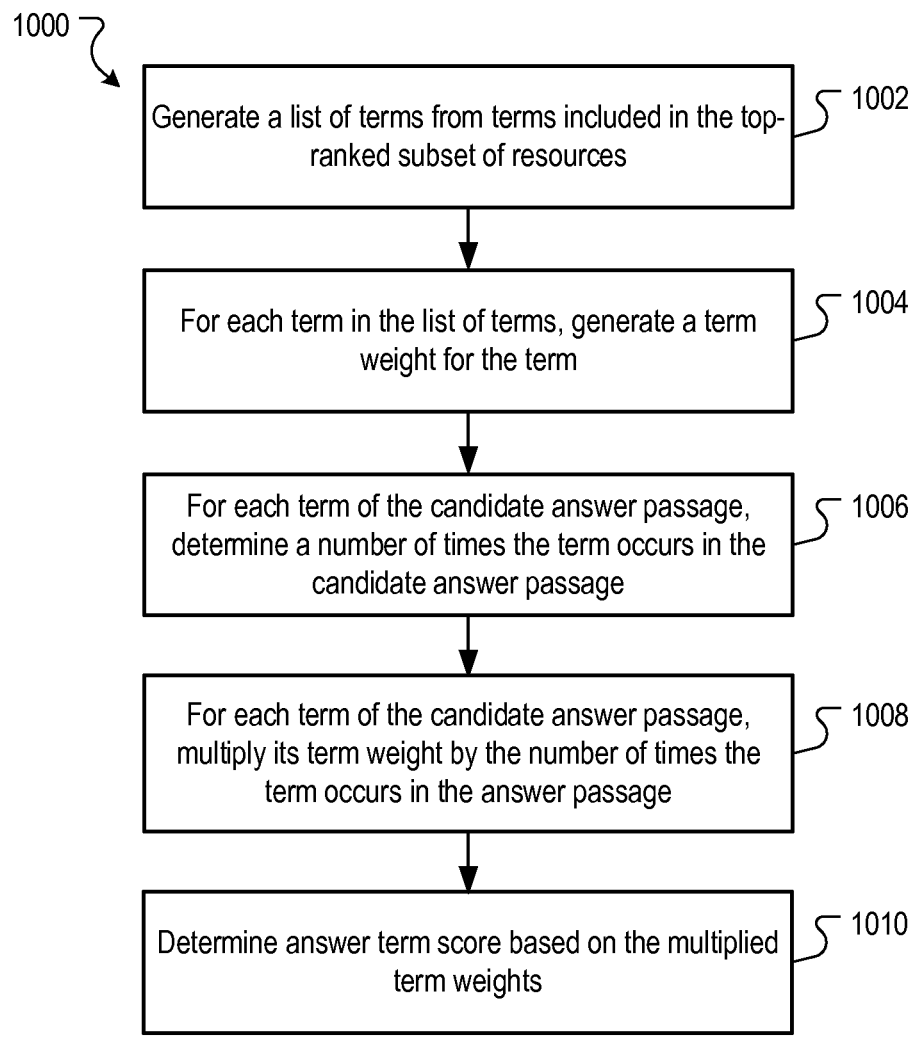
FIG. 10 is a flow diagram of an example process for scoring answer passages according to answer term features.

FIG. 10 is a flow diagram of an example process 1000 for scoring answer passages according to answer term features. The process 1000 is implemented in a data processing apparatus, such as one or more computers in a search system 110 and that are programmed to perform the operations of the answer passage scorer 124.

As described above, the answer term match score is a measure of similarity of the answer terms to the candidate answer passage. However, the answer seeking queries do not describe what the user is looking for, as the answer is unknown to the user. Thus, the query dependent scorer 142 first finds a set of likely answer terms and compares the set of likely answer terms to the candidate answer passage to generate the answer term match score. In some implementations, the set of likely answer terms is derived from the top N ranked resources returned for the query.

The process 1000 generates a list of terms from terms included in the top-ranked subset of resources (1002). For example, each resource is parsed and each term is included in a term vector. In some implementations, stop words can be omitted from the term vector.

The process 1000, for each term in the list of terms, generates a term weight for the term (1004). In some implementations, the term weight for each term is based on a number of resources in the top-ranked subset of resource in which the term occurs multiplied by an inverse document frequency (IDF) value for the term. The IDF value may be derived from a large corpus of documents, and provided to the query dependent scorer 142. Alternatively, the IDF may be derived from the top N documents. Other appropriate term weighting techniques can also be used.

The process 1000, for each term of the candidate answer passage, determines a number of times the term occurs in the candidate answer passage (1006). For example, if the term "apogee" occurs two times in a candidate answer passage, the term value for "apogee" for that candidate answer passage is 2. However, if the same term occurs three times in a different candidate answer passage, then the term value for "apogee" for the different candidate answer passage is 3.

The process 1000, for each term of the candidate answer passage, multiplies its term weight by the number of times the term occurs in the answer passage (1008). For example, assume the term weight for "apogee" is 0.04. For the first candidate answer passage, the value based on "apogee" is 0.08 (0.08×2); for the second candidate answer passage, the value based on "apogee" is 0.12 (0.04×3).

The process 1000 determines an answer term match score based on the multiplied term weights (1010). For each candidate answer passage, the component multiplied term weights can be combined in a variety of appropriate ways to determine the query independent score. For example, the scores can be summed; or the scores can be multiplied together; or combined in other appropriate ways.

Other answer term features can also be used to determine an answer term score. For example, the query dependent scorer 142 may determine an entity type for an answer response to the question query. The entity type may be determined, for example, by identifying terms that identify entities, such as persons, places or things, and selecting the terms with the highest term scores. The entity time may also be identified from the query, e.g., for the query [who is the fastest man], the entity type for an answer is "man." For each candidate answer passage, the query dependent scorer 142 then identifies entities described in the candidate answer passage. If the entities do not include a match to the identified entity type, the answer term match score for the candidate answer passage is reduced.

For example, assume the following candidate passage answer is provided for scoring in response to the query [who is the fastest man]:

Olympic sprinters have often set world records for sprinting events during the Olympics. The most popular sprinting event is the 100 meter dash.

The query dependent scorer 142 will identify several entities—Olympics, sprinters, etc.—but none of them are of the type "man." In particular, the term "sprinter" is gender neutral. Accordingly, the answer term score will be reduced. The score may be a binary score, e.g., 1 for the presence of the term of the entity type, and 0 for an absence of the term of the correct type; or alternatively may be a likelihood that is a measure of the likelihood that the correct term is in the candidate answer passage. An appropriate scoring technique can be used to generate the score.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a query determined to be a question query that seeks an answer response and data identifying resources determined to be responsive to the query and ordered according to a ranking, the query having query terms;
   for each resource in a top-ranked subset of the resources:
      receiving candidate answer passages, each candidate answer passage selected from passage units from content of the resource and being eligible to be provided as an answer passage with search results that identify the resources determined to be responsive to the query and being separate and distinct from the search results;
      determining, for each candidate answer passage, a query term match score that is a measure of similarity of the query terms to the candidate answer passage;
      determining, for each candidate answer passage, an answer term match score that is a measure of similarity of answer terms to the candidate answer passage;
      determining, for each candidate answer passage, a query dependent score based on the query term match score and the answer term match score; and
      generating an answer score that is a measure of answer quality for the answer response for the candidate answer passage based on the query dependent score.

2. The method of claim 1, wherein determining a query term match score that is a measure of similarity of the query terms to the candidate answer passage comprises determining a score that is proportional to a number of instances of matches of query terms to terms of the candidate answer passage.

3. The method of claim 1, wherein determining an answer term match score that is a measure of similarity of answer terms to the candidate answer passage comprises:
   generating a list of terms from terms included in the top-ranked subset of resources; and for each term in the list of terms, generating a term weight for the term.

4. The method of claim 3, wherein, for each term in the list of terms, generating a term weight for the term comprises:
determining a number of resources in the top-ranked subset of resource in which the term occurs; and
multiplying the number of resources in the top-ranked subset of resource in which the term occurs by an inverse document frequency value for the term.

5. The method of claim 3, wherein determining an answer term match score that is a measure of similarity of answer terms to the candidate answer passage comprises:
determining a number of times the term occurs in the candidate answer passage; and
multiplying the number of resources the term occurs in the candidate answer passage by the term weight for the term.

6. The method of claim 1, wherein determining an answer term match score that is a measure of similarity of answer terms to the candidate answer passage comprises:
determining an entity type for an answer response to the question query;
identifying entities described in the candidate answer passage; and
reducing the answer term match score if none of the identified entities match an entity of the entity type determined for the answer response.

7. The method of claim 1, further comprising:
determining, for each candidate answer passage, a query independent score for the candidate answer passage, wherein the query independent score is independent of the query and query dependent score; and
wherein generating an answer score that is a measure of answer quality for the answer response for the candidate answer passage based on the query dependent score comprises generating the answer score based on the query dependent score and the query independent score.

8. The method of claim 7, wherein determining the query independent score for the candidate answer passage comprises determining a score for the candidate answer passage based on a ranking score of the resource from which the candidate answer passage was created.

9. The method of claim 7, wherein determining the query independent score for the candidate answer passage comprises determining a score for the candidate answer passage based on a reputation of the resource from which the candidate answer passage was created.

10. The method of claim 7, wherein determining the query independent score for the candidate answer passage comprises determining a score for the candidate answer passage based on a site quality score of a site that hosts the resource from which the candidate answer passage was created.

11. The method of claim 7, wherein determining the query independent score for the candidate answer passage comprises:
determining in the candidate answer passage includes passage units from two different sections of the resource from which it was created; and
reducing the query independent score if the candidate answer passage includes passage units from two different sections of the resource.

12. The method of claim 7, wherein determining the query independent score for the candidate answer passage comprises:
determining in the candidate answer passage begins with a discourse boundary term; and
reducing the query independent score if the candidate answer passage beings with a discourse boundary term.

13. A system, comprising:
a data processing apparatus; and
a memory storage system in data communication with the data processing apparatus and storing instructions executable by the data processing apparatus and that upon such execution cause the data processing apparatus to perform operations comprising:
receiving a query determined to be a question query that seeks an answer response and data identifying resources determined to be responsive to the query and ordered according to a ranking, the query having query terms;
for each resource in a top-ranked subset of the resources:
receiving candidate answer passages, each candidate answer passage selected from passage units from content of the resource and being eligible to be provided as an answer passage with search results that identify the resources determined to be responsive to the query and being separate and distinct from the search results;
determining, for each candidate answer passage, a query term match score that is a measure of similarity of the query terms to the candidate answer passage;
determining, for each candidate answer passage, an answer term match score that is a measure of similarity of answer terms to the candidate answer passage;
determining, for each candidate answer passage, a query dependent score based on the query term match score and the answer term match score; and
generating an answer score that is a measure of answer quality for the answer response for the candidate answer passage based on the query dependent score.

14. The system of claim 13, wherein determining a query term match score that is a measure of similarity of the query terms to the candidate answer passage comprises determining a score that is proportional to a number of instances of matches of query terms to terms of the candidate answer passage.

15. The system of claim 13, wherein determining an answer term match score that is a measure of similarity of answer terms to the candidate answer passage comprises:
generating a list of terms from terms included in the top-ranked subset of resources; and
for each term in the list of terms, generating a term weight for the term.

16. The system of claim 15, wherein, for each term in the list of terms, generating a term weight for the term comprises:
determining a number of resources in the top-ranked subset of resource in which the term occurs; and
multiplying the number of resources in the top-ranked subset of resource in which the term occurs by an inverse document frequency value for the term.

17. The system of claim 15, wherein determining an answer term match score that is a measure of similarity of answer terms to the candidate answer passage comprises:
determining a number of times the term occurs in the candidate answer passage; and
multiplying the number of resources the term occurs in the candidate answer passage by the term weight for the term.

18. The system of claim 13, wherein determining an answer term match score that is a measure of similarity of answer terms to the candidate answer passage comprises:
- determining an entity type for an answer response to the question query;
- identifying entities described in the candidate answer passage; and
- reducing the answer term match score if none of the identified entities match an entity of the entity type determined for the answer response.

19. The system of claim 13, the operations further comprising:
- determining, for each candidate answer passage, a query independent score for the candidate answer passage, wherein the query independent score is independent of the query and query dependent score; and
- wherein generating an answer score that is a measure of answer quality for the answer response for the candidate answer passage based on the query dependent score comprises generating the answer score based on the query dependent score and the query independent score.

20. A memory storage system storing instructions executable by a data processing apparatus and that upon such execution cause the data processing apparatus to perform operations comprising:
- receiving a query determined to be a question query that seeks an answer response and data identifying resources determined to be responsive to the query and ordered according to a ranking, the query having query terms;
- for each resource in a top-ranked subset of the resources:
  - receiving candidate answer passages, each candidate answer passage selected from passage units from content of the resource and being eligible to be provided as an answer passage with search results that identify the resources determined to be responsive to the query and being separate and distinct from the search results;
  - determining, for each candidate answer passage, a query term match score that is a measure of similarity of the query terms to the candidate answer passage;
  - determining, for each candidate answer passage, an answer term match score that is a measure of similarity of answer terms to the candidate answer passage;
  - determining, for each candidate answer passage, a query dependent score based on the query term match score and the answer term match score; and
  - generating an answer score that is a measure of answer quality for the answer response for the candidate answer passage based on the query dependent score.

* * * * *